Jan. 2, 1940.   M. VOGEL-JORGENSEN   2,185,959
ASBESTOS CEMENT MANUFACTURE
Filed Feb. 27, 1937
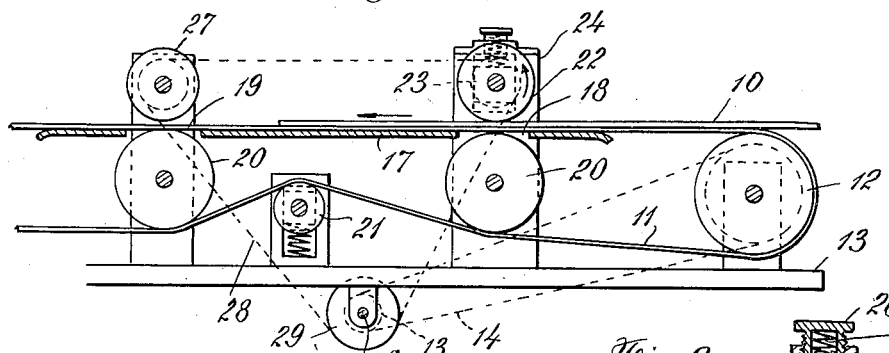
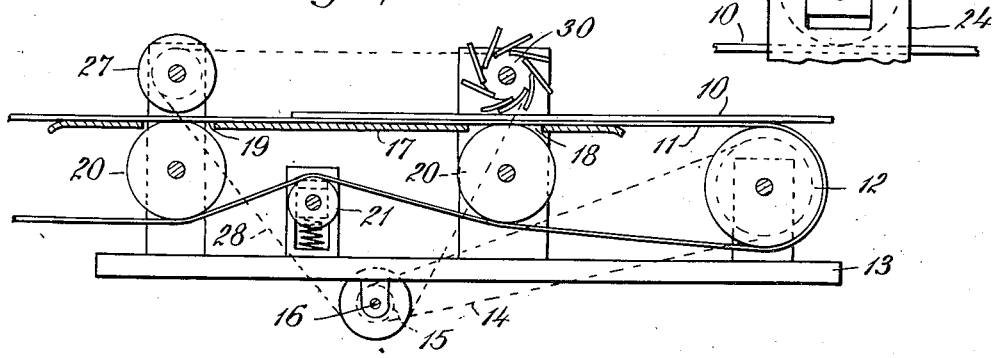
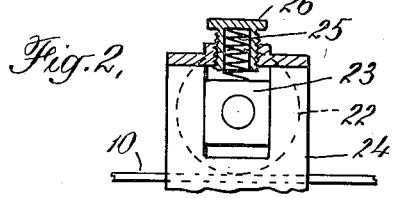
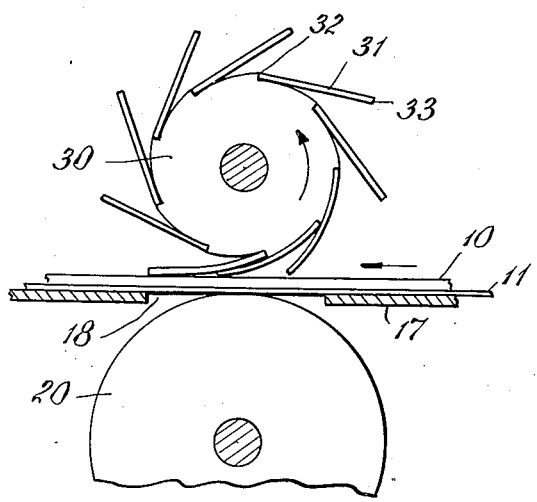
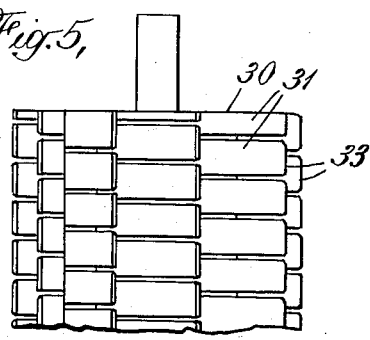
INVENTOR
Michael Vogel-Jorgensen
BY
Pennie, Davis, Marvin & Edmonds
ATTORNEYS Patented Jan. 2, 1940

2,185,959

UNITED STATES PATENT OFFICE 2,185,959

ASBESTOS CEMENT MANUFACTURE

Mikael Vogel-Jorgensen, Frederiksberg, near Copenhagen, Denmark, assignor to F. L. Smidth & Company, New York, N. Y., a corporation of New Jersey Application February 27, 1937, Serial No. 128,144 In Denmark March 2, 1936

2 Claims. (Cl. 25—42)

This invention relates to the manufacture of asbestos cement products and is concerned more particularly with a novel apparatus by which such products may be treated to prevent efflorescence thereon.

As is well known, ordinary products made of asbestos cement have a tendency to effloresce in the course of time, that is, a crystalline layer or crust develops on the surface of such products and produces an objectionable discoloration. The cause of this phenomenon is known to be the presence of very fine pores in the products, through which pores water may penetrate into the interior. Various substances, principally the free lime present, then dissolve in the water, come to the surface in solution, and are deposited in crystalline form on the surface as the water evaporates.

To overcome this objectionable tendency, various expedients have heretofore been employed. For example, substances, such as stearates or salts of other fatty acids, which serve to fill the pores directly, have been added to the mix, and also substances, such as albumins or glue, which reduce the surface tension of any liquid entering the pores, and thereby reduce the capillary action of the pores, have also been employed. The use of such added materials for the purposes referred to is objectionable, however, because substantial quantities of the substances, sufficient to impair the strength of the final product, must be used if the desired result is to be accomplished.

Other expedients, which have been employed to counteract the tendency of the products to effloresce, involve binding the free lime by hardening it by the use of carbonic acid or by the addition of suitable chemicals, such as fluo-silicates, but such treatments have the disadvantage of adding substantially to the cost of production.

The present invention is, accordingly, directed to the provision of an apparatus by the use of which asbestos cement products may be so treated as to completely eliminate or largely reduce their tendency to effloresce, this result being obtained without adding substantially to the cost of the products or impairing their quality. According to the invention, the pores formed in the surface of the products during their manufacture are closed mechanically, and this operation may be advantageously carried on by means which act on the surfaces of the products and subject them to a calendering action. It is to be understood that such calendering involves not merely the application of pressure, but a combination of pressing and smoothing operations by which the edges of the pores are chafed and distorted so that the pores are wholly closed. The operations referred to may be carried on most advantageously by passing the products in sheet form in contact with one or more rollers which are pressed against the products and are rotated at a surface speed different from that of the products. Preferably, the sheets are mounted on a conveyor and passed in contact with the rollers which are pressed yieldingly against the sheets and are rotated in such manner that the portions of the surfaces of the rollers contacting with the sheets travel in a direction opposite to that in which the sheets are moving. These calendering operations are performed in such manner that uniform pressure is exerted on the sheets throughout their width, and the operations can be performed either before or after the sheets is subjected to the final pressing operation. Preferably, the calendering action is carried on before the pressing, since in that way, it is easier to obtain a uniform pressure throughout the length of the rollers.

One of the rollers used for calendering purposes preferably has a plurality of resilient fingers acting on the surface of the sheet and the fingers may conveniently be formed of strips of rubber of suitable width and thickness secured at one end to the cylindrical core of the roller and free at the other end. The roller is then mounted in such relation to the sheet that, as the roller is rotated, the fingers are bent by their contact with the surface of the sheet, and at the same time, are drawn over the surface so that a highly effective calendering action is obtained. When a roller of this type is used, the sheet is then given a final calendering treatment by a roller with a plain surface so that any irregularities, which may have resulted from the action of the fingers, are smoothed out.

For a better understanding of the invention, reference may be had to the accompanying drawing in which Figure 1 is a view partly in side elevation and partly in longitudinal section, of apparatus suitable for practice of the new invention;

Figure 2 is a sectional view illustrating a resilient mounting for one of the calendering rollers;

Figure 3 is a view similar to Figure 1, illustrating a modified form of apparatus;

Figure 4 is an end view of a modified calendering roller; and

Figure 5 is a plan view of a portion of the roller illustrated in Figure 4.

In the use of the apparatus disclosed, the asbestos cement sheet 10 to be treated is advanced by means of a conveyor 11 in the form of a band or belt which passes about rollers, only one of which is shown. This roller 12 is mounted in bearings in standards on a suitable support 13 and is driven by a belt or chain 14 from a drive pulley or sprocket wheel 15 on a drive shaft 16. The conveyor 11 carries the sheet 10 over a table 17 having openings 18 and 19, beneath each of which lies a supporting roller 20. The rollers 20 support portions of that stretch of the conveyor which carries the sheet, and the conveyor is held taut by an idler roller 21 engaging the return stretch. Above the opening 18 and cooperating with the roller 20 is a driven roller 22 journaled in suitable bearings 23 in standards 24. The roller 22 is pressed resiliently against the supported sheet by springs 25 which act on the bearings 23 and are seated in caps 26 threaded into the standards 24. By adjustment of the caps, the pressure exerted by the roller 22 on the sheet can be regulated as desired. Above the opening 19 is a similar roller 27, the diameter of which is the same as or different from that of the roller 22.

The rollers 22 and 27 are provided with sprocket wheels or pulleys at their opposite ends and are driven by chains or belts 28 which are trained about sprocket wheels or pulleys 29 on the drive shaft 16. The rollers are driven at a substantial speed which depends on the nature of the material, and in some instances, it is advantageous to rotate one of the rollers at a higher surface speed than the other. Both rollers are so driven that their surfaces in contact with the sheet move in a direction opposite to the direction of travel of the sheet, and as a consequence, when the sheet passes between the rollers, its upper surface is smoothed and calendered and the material forming the edges of the minute pores is distorted and chafed so that the pores are closed.

The preferred form of the apparatus is shown in Figure 3 and, as shown, it includes a roller 30 consisting of a suitable core of wood or the like provided with a plurality of resilient fingers 31. These fingers, which may be of rubber, are attached in any suitable way, as at 32, to the surface of the core and project tangentially therefrom so that their free ends 33 lie a substantial distance from the surface of the core. This roller is so mounted, that, when it is rotated, the fingers thereon are bent back by engagement with the sheet, and are drawn in flexed condition along the surface of the sheet to effect the desired calendering action. The roller employed may have the fingers arranged thereon in any desired manner, as, for example, the fingers may be arranged in a plurality of rows extending axially of the roller.

The procedure described may be employed in the treatment of ordinary asbestos cement sheets, or, if desired, the substances previously referred to as having been used heretofore for preventing efflorescence, may be used in conjunction with the mechanical treatment described. In that case, the mechanical treatment reduces the amount of the added substances required and simplifies the treatment in that these substances may be either sprayed or otherwise supplied to the sheet before or during the calendering, and need not be added to the mix.

The new treatment not only produces sheets with a smooth, tight, non-absorptive surface, but in addition, improves the quality of colored sheets in that the superficially applied colors have a purer, clearer appearance.

The new treatment is preferably applied to products in the form of sheets, as described, but, after the treatment, the sheets may, if desired, be finally pressed into corrugated shapes or given other forms in any desired manner.

I claim:

1. Apparatus for the treatment of asbestos cement products which comprises a traveling support for the products, a roller having a plurality of resilient members extending tangentially therefrom, the members having flat free ends of substantial area, a mounting in which the roller is supported for rotation with its axis transverse to the direction of travel of said traveling support, the position of the roller relative to the support being such that the members engage the surfaces of the products on the support and are flexed, and means for rotating the roller in a direction such that the members in contact with the products move along the surfaces thereof in a direction opposite to the direction of travel of said surfaces, the members consolidating the surface material of the products and closing the pores in said surfaces in their movement.

2. In apparatus for the treatment of asbestos cement sheets, the combination of a traveling support for a sheet, a roller above the sheet carrying a plurality of tangentially arranged resilient members having flat free ends of substantial area, the members being mounted in rows on the roller with the members of adjacent rows staggered, a mounting in which the roller is supported for rotation with its axis transverse to the direction of movement of a sheet on the support, the members engaging the surface of the sheet being flexed, and means for rotating the roller at a speed such that the free ends of the members press and smooth the surface of the sheet and consolidate the surface material and close the surface pores thereof.

MIKAEL VOGEL-JORGENSEN.